United States Patent
Lindenmayr et al.

(10) Patent No.: US 12,065,206 B2
(45) Date of Patent: Aug. 20, 2024

(54) STEERING TORQUE SENSOR ASSEMBLY

(71) Applicant: Schaeffler Technologies AG & Co. KG, Herzogenaurach (DE)

(72) Inventors: Thomas Lindenmayr, Nuremberg (DE); Bernd Wittmann, Pommersfelden (DE); Stephan Neuschaefer-Rube, Herzogenaurach (DE)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 298 days.

(21) Appl. No.: 17/609,010

(22) PCT Filed: Apr. 20, 2020

(86) PCT No.: PCT/DE2020/100319
§ 371 (c)(1),
(2) Date: Nov. 5, 2021

(87) PCT Pub. No.: WO2020/228887
PCT Pub. Date: Nov. 19, 2020

(65) Prior Publication Data
US 2022/0212719 A1    Jul. 7, 2022

(30) Foreign Application Priority Data
May 13, 2019    (DE) ............. 10 2019 112 422.0

(51) Int. Cl.
*B62D 6/10* (2006.01)
*B62D 5/04* (2006.01)
*G01L 3/10* (2006.01)
*G01L 5/22* (2006.01)

(52) U.S. Cl.
CPC ............. *B62D 6/10* (2013.01); *B62D 5/0463* (2013.01); *G01L 3/101* (2013.01); *G01L 5/221* (2013.01)

(58) Field of Classification Search
CPC ......... B62D 6/10; B62D 5/0463; G01L 3/101; G01L 5/221; G01L 3/102
See application file for complete search history.

(56) References Cited

U.S. PATENT DOCUMENTS

| 6,758,105 | B2 | 7/2004 | Viola et al. | |
| 7,086,295 | B2 * | 8/2006 | Izumi | B62D 5/0406 73/862.325 |
| 7,243,557 | B2 * | 7/2007 | May | G01L 3/102 73/862.331 |
| 7,380,474 | B2 * | 6/2008 | Izumi | G01L 3/105 73/862.322 |

(Continued)

FOREIGN PATENT DOCUMENTS

| CN | 107407608 A | 11/2017 |
| CN | 113994182 A * | 1/2022 |

(Continued)

*Primary Examiner* — Octavia Hollington

(57) ABSTRACT

A steering torque sensor assembly includes a magnetically coded steering shaft section, which forms a primary sensor, and a secondary sensor for converting the changes in a magnetic field generated by the primary sensor into an electrical signal. The secondary sensor is situated on a sensor circuit board which runs parallel to the steering shaft section and is positioned opposite the primary sensor.

17 Claims, 2 Drawing Sheets

(56) References Cited

U.S. PATENT DOCUMENTS

| 8,087,306 | B2* | 1/2012 | Goll | G01L 3/101 |
| | | | | 73/862.331 |
| 2005/0193834 | A1 | 9/2005 | May | |
| 2022/0260438 | A1* | 8/2022 | Hintze | B62D 6/10 |

FOREIGN PATENT DOCUMENTS

| DE | 102004023801 A1 | | 8/2005 |
| DE | 602004006320 T2 | | 1/2008 |
| DE | 102007059364 A1 | | 8/2008 |
| DE | 102007059361 A1 | * | 9/2008 |
| DE | 102008035989 A1 | | 2/2009 |
| DE | 102009046997 A1 | * | 5/2011 |
| DE | WO2011141179 | * | 11/2011 |
| DE | 102011055893 A1 | * | 6/2013 |
| DE | 102013219761 B3 | | 1/2015 |
| DE | 102017107716 A1 | | 10/2018 |
| DE | 102017109532 A1 | | 11/2018 |
| DE | 102017116454 A1 | | 1/2019 |
| DE | 102017116508 A1 | | 1/2019 |
| DE | 102017130075 A1 | | 6/2019 |
| DE | 102018107570 A1 | | 10/2019 |
| DE | 102018110553 A1 | | 11/2019 |
| DE | 102018118174 | | 1/2020 |
| DE | 102019124973 | * | 1/2021 |
| EP | 3285055 A1 | | 2/2018 |
| JP | 2016027318 A | | 2/2016 |
| JP | 2016161290 A | * | 9/2016 |
| KR | 20100038718 A | * | 4/2010 |
| KR | 101339503 B1 | * | 12/2013 |
| KR | 20140005061 A | * | 1/2014 |
| KR | 20180017778 A | * | 2/2018 |
| WO | 2018202243 A1 | | 11/2018 |

* cited by examiner

STEERING TORQUE SENSOR ASSEMBLY

CROSS-REFERENCE TO RELATED APPLICATIONS

This application is the U.S. National Phase of PCT Appln. No. PCT/DE2020/100319 filed Apr. 20, 2020, which claims priority to DE 10 2019 112 422.0 filed May 13, 2019, the entire disclosures of which are incorporated by reference herein.

TECHNICAL FIELD

The disclosure relates to a steering torque sensor assembly for a vehicle.

BACKGROUND

DE10 2008 035 989 A1 describes a steering device with a rotatable steering shaft which has a housing, a drive end for connection to a steering element, and a drive end for connection to at least one steerable vehicle wheel. An electric motor is in operative connection with the steering shaft in order to rotate it about its longitudinal axis. The steering shaft is magnetized and serves as a torque transducer. At least one magnetic field sensor is attached near the outside of the steering shaft. The steering shaft and the magnetic field sensor form a torque sensor unit which is used to detect the torque that acts on the steering shaft through the steering element and to provide a signal to operate an electric motor which assists the steering with the steering element via the steering shaft.

From U.S. Pat. No. 6,758,105 B2, a magnetoelastic torque sensor unit is known which is used to detect a torque on a shaft, in particular on a steering shaft of a vehicle. The sensor unit comprises a plastic injection molded body that defines an axial channel and has an axial opening. Furthermore, a U-shaped guide frame is arranged in the plastic injection-molded body, with lateral sections of the guide frame engaging in side parts of the plastic injection-molded body. Magnetic flow sensors are arranged in the side parts of the plastic injection-molded body and connected to the guide frame. The shaft is guided through the axial opening of the plastic injection-molded body and extends in the axial channel. The magnetic flux sensors are positioned in a predetermined arrangement over the shaft. The sensor array formed comprises sensors which are arranged in a plane running through the axis, either opposite one another or axially spaced apart.

DE10 2018 110 553, which was still unpublished at the date of application, describes a torque sensor assembly for determining a torque on a machine element extending along an axis. This torque sensor assembly has at least one primary sensor, which is designed as a magnetically encoded section of the machine element, and at least one secondary sensor arranged opposite the primary sensor for converting the changes in a magnetic field generated by the primary sensor into an electrical signal. The secondary sensor is arranged on a circuit board which has a base surface and at least one surface that runs at an angle to this base surface. The angled surface is arranged opposite the primary sensor. The secondary sensor is arranged on this angled surface. Furthermore, a sleeve-shaped carrier is provided to which the circuit board is attached. This earlier patent application also describes an electromechanical roll stabilizer for a vehicle as a preferred application of the torque sensor. The roll stabilizer comprises said torque sensor assembly, two stabilizer parts, each of which can be coupled to a wheel suspension of the vehicle, and an actuator arranged between the stabilizer parts for applying torque to the stabilizer parts. The torque sensor assembly detects the torques impressed on the stabilizer parts, the primary sensor being designed as a magnetically encoded section of a flange serving to connect the stabilizer part to the actuator.

SUMMARY

It is desirable to provide an improved steering torque sensor assembly which delivers a stronger torque-dependent measurement signal without the mechanical stresses in the steering assembly having to be increased for this purpose. This is intended to indirectly improve the signal-to-noise ratio of the measurement signal. In addition, a space-optimized design of the steering torque sensor assembly is sought.

The steering torque sensor assembly is suitable for a vehicle, in particular a motor vehicle, which is driven, for example, by an internal combustion engine or an electric motor and comprises a steering system to be operated by a driver. In a known manner, such a steering system comprises a steering wheel, a usually multi-link steering shaft and a steering gear which transmits the steering movement initiated via the steering wheel to the steered vehicle wheels. The steering gear may be replaced by steering drives so that the initiated steering movement is transmitted indirectly to the vehicle wheels by hydraulic or electrical drives. The present steering torque sensor assembly should detect the torque acting on the steering shaft and make it available for further processing in the form of a measurement signal. For this purpose, the steering torque sensor assembly comprises a magnetically encoded steering shaft section which forms a primary sensor. A mechanical tension on the primary sensor leads to a change in the magnetic field. Furthermore, the steering torque sensor assembly comprises at least one secondary sensor for converting the changes in the magnetic field generated by the primary sensor into an electrical signal. The secondary sensor is arranged on at least one sensor circuit board which runs parallel to the steering shaft and is positioned opposite the primary sensor.

The arrangement of the sensor circuit board parallel to the steering shaft, namely opposite the magnetically encoded steering shaft section which forms the primary sensor, enables a minimization between the sensor elements, which results in a significantly stronger measurement signal if the mechanical tension in the steering shaft remains the same. This leads to a higher measurement accuracy and an improvement in the signal-to-noise ratio. Thus, at least one secondary sensor is arranged opposite the primary sensor. The secondary sensor is used to convert the changes in the magnetic field of the primary sensor into an electrical signal. The secondary sensor is located on a circuit board and is preferably designed as an integrated circuit structure.

The sensor circuit board may be divided into two sensor circuit board panels, which are each arranged parallel to the steering shaft opposite the primary sensor and are preferably connected to one another via a flexible ribbon cable extending circumferentially to the steering shaft in sections. This multi-panel design of the secondary sensor makes it possible to arrange several sensors with an angular offset in relation to the primary sensor, whereby the measurement signal can be further improved.

The secondary sensor of the steering torque sensor assembly may also include a controller circuit board, which is designed mechanically separate from the sensor circuit board and is electrically connected to the sensor circuit board. This allows the necessary electrical/electronic components to be appropriately distributed on separate circuit boards. The controller circuit board can be positioned further away than the sensor circuit board from the steering shaft.

One advantage of this division is that the arrangement of parts of the secondary sensor on the sensor circuit board enables it to be positioned very close to the primary sensor. The very small distance between the magnetic field of the primary sensor and the secondary sensor results in comparatively strong homogeneous magnetic fields in the area of the secondary sensor. The arrangement achieves a very high level of robustness against external interference fields. It is also advantageous that both axial and radial magnetic fields can be measured with the steering torque sensor assembly since the secondary sensors can be arranged in three dimensions. The solution can be implemented cost-effectively and with little effort.

By arranging the sensor components on the sensor circuit board, a compact unit is available which can be mounted on the steering shaft with little effort. The sensor circuit board and the controller circuit board are preferably made of plastic. An evaluation unit for evaluating the signals from the secondary sensor, which is preferably designed as an integrated circuit structure, is preferably located on the sensor circuit board and/or on the controller circuit board. The evaluation unit is preferably able to exchange data with an external data processing unit.

According to an advantageous embodiment, the sensor circuit board comprises two sensor circuit board panels angled relative to one another, on each of which at least one secondary sensor is arranged. According to a preferred embodiment, the sensor circuit board panels are each connected to the controller circuit board via a flexible region.

The at least one secondary sensor is preferably formed by a Forster probe, by a fluxgate magnetometer, by a Hall sensor, by a coil, by a semiconductor sensor, or by an XMR sensor. In principle, another type of sensor can also be used, provided that it is suitable for measuring the magnetic field caused by the inverse magnetostrictive effect.

The magnetically encoded steering shaft section, which forms the primary sensor, preferably extends completely circumferentially around the steering shaft. The magnetically encoded steering shaft section is preferably permanently magnetized, so that the magnetization is formed by permanent magnetization. In alternative embodiments, the steering torque sensor assembly furthermore has at least one magnet for magnetizing the magnetically encoded steering shaft section so that the magnetization of the magnetically encoded steering shaft section is essentially temporary. The at least one magnet can be formed by at least one permanent magnet or, alternatively, by an electromagnet.

The steering shaft is preferably equipped with two magnetic tracks that form the primary sensor. A secondary sensor is preferably arranged opposite each of the magnetic tracks.

BRIEF DESCRIPTION OF THE DRAWINGS

Further advantages and details arise from the following description of embodiments with reference to the attached drawing. In the figures.

DETAILED DESCRIPTION

Figure 1:
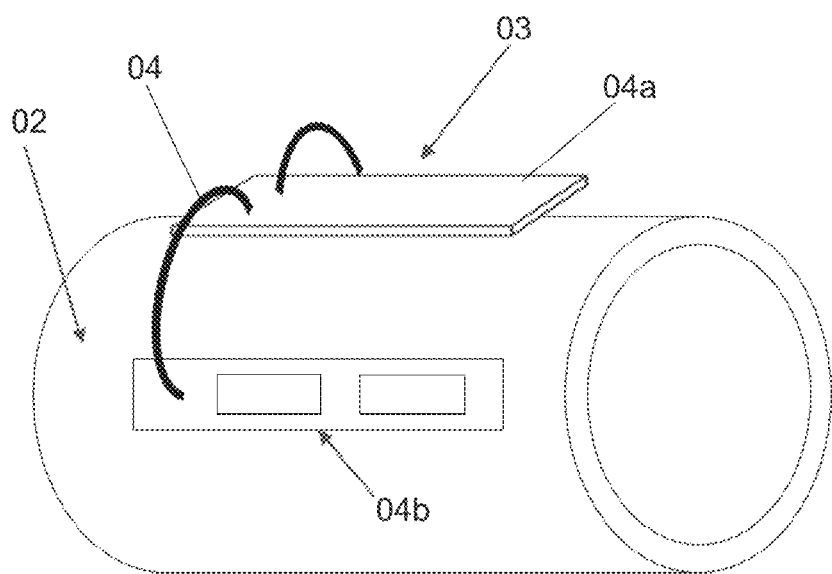
FIG. 1 shows a simplified perspective illustration of an embodiment of a steering torque sensor assembly.

FIG. 1 shows, in a greatly simplified perspective view, a steering torque sensor assembly 01, which comprises magnetically encoded steering shaft section 02 as a primary sensor and a secondary sensor 03. The secondary sensor has a sensor circuit board 04 which is divided into two sensor circuit board panels 04a, 04b, which both extend parallel to the magnetically encoded steering shaft section 02 and are arranged only a small radial distance from it. The radial distance between the sensor circuit board 04 and the magnetically encoded steering shaft section 02 is, for example, 0.5 to 2 mm. The two sensor circuit board panels 04a, 04b are electrically connected to one another via a cable 05.

Figure 2:
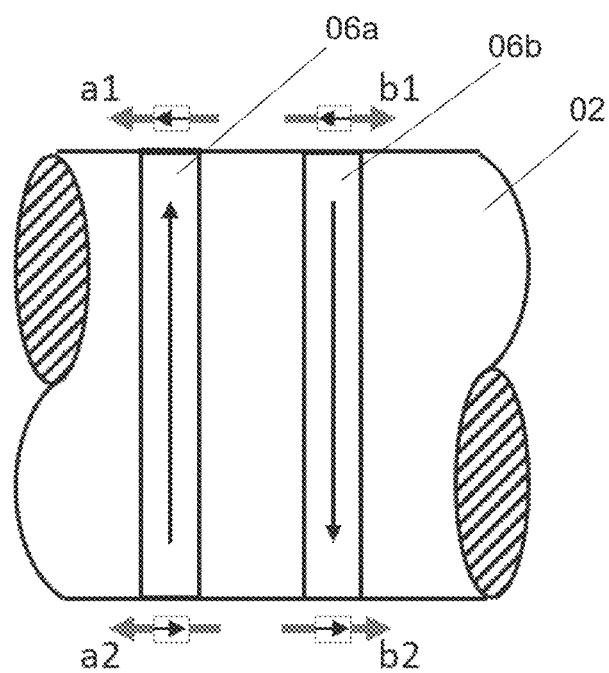
FIG. 2 shows a partially sectional side view of a magnetically encoded steering shaft section.

FIG. 2 shows a side view of the magnetically encoded steering shaft section 02, which is a section of the steering shaft of a vehicle and can rotate about its axis of rotation. In the embodiment shown, the steering shaft section comprises two magnetic tracks 06a, 06b as primary sensors. These are magnetically encoded sections of the steering shaft, which are arranged on the outer surface of the steering shaft or can be integrated into the material. The magnetically encoded tracks 06 extend completely circumferentially around the axis of rotation and are preferably designed in opposite directions. The tracks can be formed axially spaced from one another. The magnetically encoded steering shaft section 02 is preferably made of a ferromagnetic material which can be magnetically encoded in some sections in a simple manner. The primary sensors 06 convert the forces applied to the magnetically encoded steering shaft section 02 into a magnetic signal which can be detected on the outer surface of the steering shaft.

Figure 3:
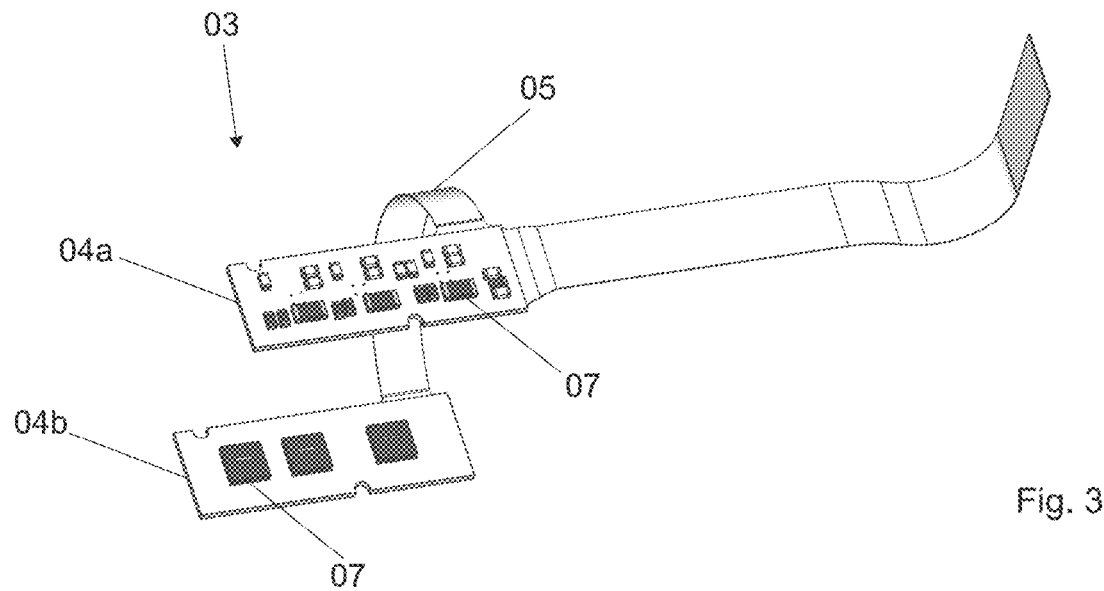
FIG. 3 shows a perspective illustration of an embodiment of a sensor circuit board with two sensor circuit board panels.

FIG. 3 shows a perspective view of a first embodiment of the secondary sensor 03 with the two sensor circuit board panels 04a, 04b. The steering torque sensor assembly 01 comprises multiple sensor elements 07, which after installation are arranged in the immediate vicinity of the primary sensors 06. The sensor elements 07 convert changes in the magnetic field, which are caused by forces or mechanical stresses acting on the primary sensors, into an electrical signal. The sensor elements 07 are designed as integrated circuit structures which are arranged on the sensor circuit board 04. The two angularly offset sensor circuit board panels 04a, 04b are arranged opposite one another.

Figure 4:
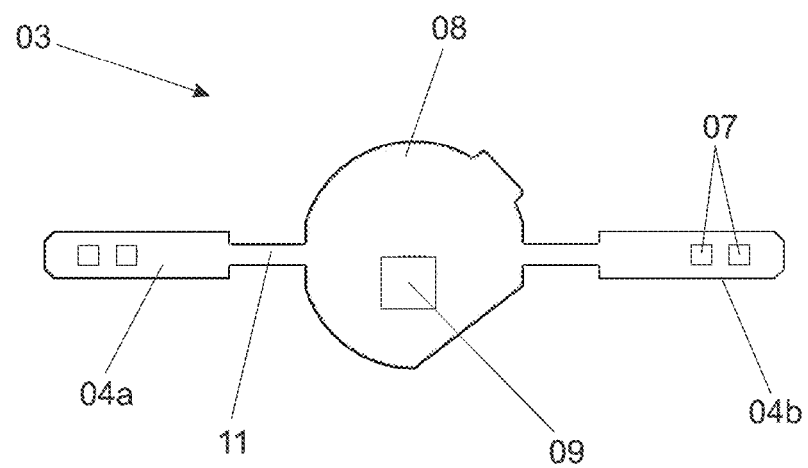
FIG. 4 shows a plan view of a modified embodiment of the sensor circuit board with a controller circuit board.

FIG. 4 shows a modified embodiment of the secondary sensor 03, which here also comprises a controller circuit board 08 in addition to the two sensor circuit board panels 04a, 04b. The secondary sensor 03 is shown in its non-angled or non-bent state in FIG. 4, i.e., the two sensor circuit board panels 04a, 04b are still in one plane with the controller circuit board 08. During installation, the sensor circuit board panels are bent relative to the controller circuit board so that they extend essentially perpendicular to the latter. An evaluation unit 09 is arranged on the controller circuit board 08. The sensor circuit board panels 04a, 04b are dimensioned with a smaller width than the controller circuit board 08. The sensor circuit board panels are each connected to the controller circuit board 08 via a flexible region 11. The flexible regions 11 enable an angular alignment of the sensor circuit board panels 04a, 04b relative to the controller circuit board 08, so that the sensor circuit board panels 04*a*, 04*b* then lie parallel to the steering shaft section 02.

LIST OF REFERENCE SYMBOLS

01 Steering torque sensor assembly
02 Magnetically encoded steering shaft section
03 Secondary sensor
04 Sensor circuit board
05 Cable
06 Primary sensors
07 Sensor elements
08 Controller circuit board
09 Evaluation unit
10 -
11 flexible region

The invention claimed is:

1. A steering torque sensor assembly for a vehicle, comprising:
    a magnetically encoded steering shaft section forming a primary sensor,
    a secondary sensor configured for converting changes in a magnetic field generated by the primary sensor into an electrical signal, the secondary sensor arranged on a sensor circuit board extending parallel to the steering shaft section and arranged opposite the primary sensor, and the sensor circuit board is divided into two mechanically separate sensor circuit board panels arranged in parallel to the steering shaft section opposite the primary sensor.

2. The steering torque sensor assembly according to claim 1, wherein the secondary sensor further comprises a controller circuit board which is configured to be mechanically separate from the sensor circuit board and is-electrically connected to it the sensor circuit board.

3. The steering torque sensor assembly according to claim 2, wherein the controller circuit board extends at an angle to the steering shaft section and is connected to the sensor circuit board via a ribbon cable.

4. The steering torque sensor assembly according to claim 2, wherein an evaluation unit for evaluating the signals from the secondary sensor is arranged on the controller circuit board.

5. The steering torque sensor assembly according to claim 1, wherein the magnetically encoded steering shaft section forming the primary sensor is formed on an upper section of the steering shaft close to a steering wheel.

6. The steering torque sensor assembly according to claim 1, wherein the magnetically encoded steering shaft section extends on an inner surface of the steering shaft.

7. The steering torque sensor assembly according to claim 1, wherein an evaluation unit for evaluating the signals from the secondary sensor is arranged on the sensor circuit board.

8. The steering torque sensor assembly according to claim 1, wherein multiple primary sensors are formed on the magnetically encoded steering shaft section, each of which is opposite at least one sensor element of the secondary sensor.

9. The steering torque sensor assembly according to claim 1, wherein the sensor circuit board is designed as a flexible circuit board or a rigid-flexible circuit board.

10. The steering torque sensor assembly according to claim 9, wherein the sensor circuit board has at least one flexible region.

11. The steering torque sensor assembly according to claim 1, wherein the magnetically encoded steering shaft section forming the primary sensor is formed on a central section of the steering shaft located between two universal joints.

12. The steering torque sensor assembly according to claim 1, wherein the magnetically encoded steering shaft section forming the primary sensor is formed on a lower section of the steering shaft close to a steering gear.

13. The steering torque sensor assembly according to claim 1, wherein the sensor circuit board is designed as a flexible circuit board or a rigid-flexible circuit board.

14. The steering torque sensor assembly according to claim 1, wherein each of the two mechanically separate sensor circuit board panels have a plurality of sensor elements arranged axially along an axis of rotation of the steering shaft section.

15. The steering torque sensor assembly according to claim 14, wherein the sensor elements are configured as integrated circuit structures.

16. The steering torque sensor assembly according to claim 1, wherein the two mechanically separate sensor circuit board panels are connected to each other via a ribbon cable extending circumferentially around the steering shaft section.

17. The steering torque sensor assembly according to claim 16, wherein the two mechanically separate sensor circuit board panels are arranged opposite to one another.

* * * * *